United States Patent
Vijn et al.

(12)

(10) Patent No.: US 6,457,523 B1
(45) Date of Patent: Oct. 1, 2002

(54) DELAYED THIXOTROPIC CEMENT COMPOSITIONS AND METHODS

(75) Inventors: Jan Pieter Vijn, Leiden; Bach Dao, Lisse, both of (NL)

(73) Assignee: Halliburton Energy Services, Inc., Duncan, OK (US)

( * ) Notice: Subject to any disclaimer, the term of this patent is extended or adjusted under 35 U.S.C. 154(b) by 0 days.

(21) Appl. No.: 09/612,060

(22) Filed: Jul. 7, 2000

(51) Int. Cl.$^7$ .............................................. E21B 33/14
(52) U.S. Cl. ........................................ 166/293; 166/285
(58) Field of Search ................................ 166/285, 292, 166/293; 106/713, 724

(56) References Cited

U.S. PATENT DOCUMENTS

| | | | |
|---|---|---|---|
| 3,959,003 A | 5/1976 | Ostroot et al. ................ 106/93 |
| 4,125,160 A | 11/1978 | Crinklemeyer et al. ..... 166/293 |
| 4,515,216 A | 5/1985 | Childs et al. ................ 166/293 |
| 4,524,828 A | 6/1985 | Sabins et al. ................ 166/293 |
| 4,924,942 A | * 5/1990 | Shen ............................ 166/291 |
| 5,125,455 A | * 6/1992 | Harris et al. ................. 166/292 |
| 5,332,040 A | * 7/1994 | Najm et al. .................. 166/293 |
| 5,547,506 A | * 8/1996 | Rae et al. .................... 106/730 |
| 6,145,591 A | * 11/2000 | Boncan et al. .............. 166/291 |
| 6,173,778 B1 | * 1/2001 | Rae et al. .................... 166/293 |
| 6,230,804 B1 | * 5/2001 | Mueller et al. ............. 166/293 |

OTHER PUBLICATIONS

Chemical Abstract XP 000472441 dated Mar. 21, 1994.
Chemical Abstract XP 000183685 dated Oct. 1, 1984.

* cited by examiner

*Primary Examiner*—David Bagnell
*Assistant Examiner*—Jennifer R. Dougherty
(74) *Attorney, Agent, or Firm*—Craig W. Roddy; C. Clark Dougherty, Jr.

(57) ABSTRACT

Delayed thixotropic cement compositions and methods of cementing in subterranean zones penetrated by well bores are provided. The novel cement compositions are basically comprised of a hydraulic cement, sufficient water to form a slurry and a water soluble delayed thixotropy imparting additive selected from the group consisting of carbonic acid and alkali metal carbonates.

11 Claims, 1 Drawing Sheet

DELAYED THIXOTROPIC CEMENT COMPOSITIONS AND METHODS

BACKGROUND OF THE INVENTION

1. Field of the Invention

This invention relates to thixotropic cement compositions and methods of using the same such as in cementing pipe strings in well bores without substantial loss of the cement composition.

2. Description of the Prior Art

Thixotropic cement compositions have been used heretofore for plugging lost circulation zones in well bores and for cementing pipe strings in well bores containing fractures, vugs and other high permeability zones. The gel strengths of the thixotropic cement compositions are low during mixing and pumping when the compositions are subjected to high shear stress, but when the compositions are subjected to static conditions, i.e., low or no shear stress, they quickly develop high gel strengths and high viscosities. This property prevents substantial loss of the thixotropic compositions when they are placed across and enter lost circulation zones.

The thixotropic cement compositions which have been utilized heretofore often include solid particulate thixotropy imparting agents which must be mixed with dry particulate cement and other solid additives prior to forming the solid materials into a slurry by the addition of mixing water thereto. In offshore operations, the particulate solid materials are dry blended onshore and several blends are taken to the offshore rig, e.g., thixotropic blends and non-thixotropic blends, so that the appropriate blend may be selected and mixed with water just before the cementing job is performed. This procedure of having several dry particulate solid cement blends on the site lends itself to confusion and possible mistake and also creates the requirement that the unused dry particulate blend must be returned or disposed of.

In well cementing operations such as primary cementing whereby pipe strings are sealingly cemented in well bores, thixotropic well cementing compositions and methods which prevent substantial loss of the cement compositions into fractures, vugs and the like in the well bore are advantageous. Since the cement composition is circulated downwardly through the pipe string to be cemented and upwardly into and through the annulus between the pipe string and the walls of the well bore, it would also be advantageous to utilize a delayed thixotropic cement composition which does not develop thixotropic properties, and as a result is less viscous and more easily pumped, until it has been pumped a substantial distance through the pipe string.

Thus, there are continuing needs for improved thixotropic cement compositions whereby the thixotropy imparting agent can be dissolved in the mixing water instead of being added to the dry particulate solid cement and whereby the onset of thixotropic properties after the cement composition has been prepared is delayed.

SUMMARY OF THE INVENTION

The present invention provides delayed thixotropic cement compositions and methods which meet the needs described above and overcome the deficiencies of the prior art. The delayed thixotropic well cementing compositions of the present invention are basically comprised of a hydraulic cement, sufficient water to form a slurry and a water soluble delayed thixotropy imparting additive selected from the group consisting of carbonic acid and alkali metal carbonates.

The methods of this invention for cementing in a subterranean zone penetrated by a well bore are basically comprised of the following steps. A delayed thixotropic cement composition comprised of a hydraulic cement, sufficient water to form a slurry and a water soluble delayed thixotropy imparting additive selected from the group consisting of carbonic acid and alkali metal carbonates is prepared. Thereafter, the cement composition is pumped into the zone to be cemented and allowed to set into a hard impermeable mass therein.

It is, therefore, a general object of the present invention to provide improved delayed thixotropic cement compositions and methods.

Other and further objects, features and advantages of the present invention will be readily apparent to those skilled in the art upon a reading of the description of preferred embodiments which follows.

DESCRIPTION OF PREFERRED EMBODIMENTS

Figure 1:
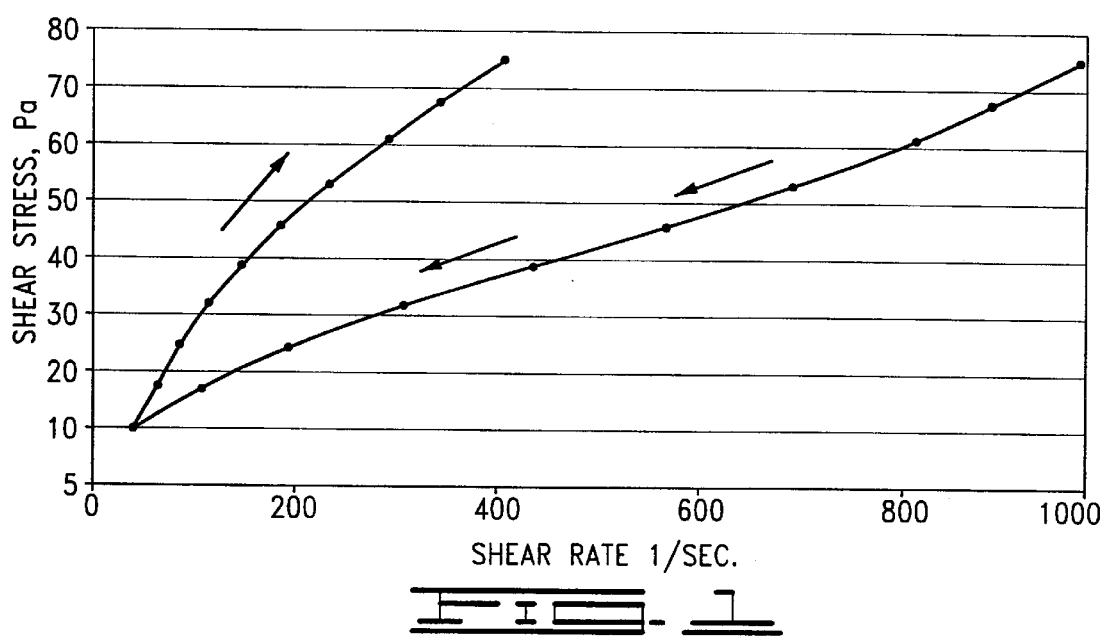
FIG. 1 shows shear stress as a function of shear rate in a down/up sweep of a 13.9 lbs/gal thixotropic cement formulation at 50° C.

The present invention provides improved delayed thixotropic cement compositions and methods of using the cement compositions for cementing subterranean zones penetrated by well bores. While the compositions and methods can be utilized advantageously in both onshore and offshore wells, they are particularly advantageous in cementing offshore wells since the thixotropy imparting additive of this invention can be dissolved in the mixing water and does not have to be premixed with the dry particulate solid cement and other particulate solid additives. Also, as mentioned, once the cement composition is mixed, e.g., on-the-fly, the onset of the thixotropic properties in the cement composition is delayed for an initial period of time.

The delayed thixotropic well cementing compositions of this invention are basically comprised of a hydraulic cement, sufficient water to form a slurry and a water soluble delayed thixotropy imparting additive selected from the group consisting of carbonic acid and alkali metal carbonates. Examples of alkali metal carbonates which can be utilized include, but are not limited to, sodium carbonate, potassium carbonate, ammonium carbonate and lithium carbonate. Of the various alkali metal carbonates and acids which can be utilized, sodium carbonate is presently preferred. Generally, the thixotropy imparting additive is present in the thixotropic well cementing composition of this invention in an amount in the range of from about 0.1% to about 8% by weight of the hydraulic cement in the composition, more preferably in the range of from about 0.5% to about 4% and most preferably about 3%.

The thixotropy imparting additive can be dry blended with the cement used, added to a cement slurry after the slurry is formed, or it can be predissolved in the mixing water so that the mixing water can subsequently be mixed with the dry particulate solid cement and other particulate solid additives used (if any) to form a thixotropic cement composition of this invention just prior to utilizing the cement composition in a well cementing operation. The thixotropy imparting additive in the cement composition reacts with calcium released during the ensuing cement hydration process. The onset of thixotropic properties in the cement composition is delayed until a sufficient quantity of calcium is released. The calcium reacts with the thixotropy imparting additive to produce finely divided, colloidal particles of calcium carbonate which induce thixotropic properties in the resulting cement composition. Typically, substantial thixotropic properties are not imparted to the cement composition for a time period up to about 5 minutes after the components of the thixotropic cement compositions are mixed.

A variety of hydraulic cements which produce calcium when hydrated can be utilized in accordance with the present invention. Such hydraulic cements include Portland cements, alumina cements, blast furnace slag cements and Pozzolanic cements. Of these, Portland cements or their equivalents are generally preferred. Portland cements of the types defined and described in API Specification For Materials And Testing For Well Cements, API Specification 10, Fifth Edition, dated Jul. 1, 1990 of the American Petroleum Institute are particularly suitable. Preferred API Portland cements include classes A, B, C, G and H, with API Classes G and H being more preferred and class G being the most preferred.

The water utilized to form the cement compositions of this invention can be fresh water, unsaturated salt solutions and saturated salt solutions including brines and seawater. The water is included in the cement compositions in an amount sufficient to form a slurry of the hydraulic cement and any insoluble particulate solid additives utilized. Generally, the water is present in the cement compositions in an amount in the range of from about 35% to about 100% by weight of hydraulic cement therein, more preferably in an amount of from about 40% to about 90%.

As will be understood by those skilled in the art, the delayed thixotropic well cementing compositions of this invention can include a variety of cement composition additives including, but not limited to, set and compressive strength accelerating additives, set retarders, viscosifiers and the like. Examples of set and compressive strength accelerating additives which can be used include, but are not limited to, sodium chloride, calcium chloride, triethanolamine, sodium silicate and sodium aluminate. Examples of set retarders include, but are not limited to, lignosulfonates, acrylic acid/2-acrylamido-2-methylpropane sulfonic acid copolymers and carboxymethylcellulose. Viscosifiers which can be utilized include, but are not limited to, hydroxyethylcellulose, carboxymethylcellulose, guar gum, hydroxypropylguar, xanthan gum, scleroglican acrylate derivative copolymers and terpolymers, bentonite, hectorite and sepeolite. Viscosifiers reduce segregation (free water or settling) in the cement composition.

A preferred delayed thixotropic well cementing composition of this invention is comprised of API Class G Portland cement, water for forming a slurry present in an amount in the range of from about 70% to about 75% by weight of the cement in the composition and sodium carbonate present in an amount in the range of from about 3% to about 4% by weight of the cement in the composition.

The methods of the present invention for cementing in a subterranean zone penetrated by a well bore are basically comprised of the following steps. A delayed thixotropic cement composition is prepared comprising a hydraulic cement, sufficient water to form a slurry and a water soluble delayed thixotropy imparting additive selected from the group consisting of carbonic acid and alkali metal carbonates. Thereafter, the cement composition is pumped into the subterranean zone to be cemented and the cement composition is allowed to set into a hard impermeable mass therein.

A more specific preferred method of cementing in a subterranean zone penetrated by a well bore comprises the following steps. A delayed thixotropic cement composition is prepared comprising Portland cement, water for forming a slurry in an amount in the range of from about 44% to about 75% by weight of the cement in the composition and a water soluble delayed thixotropy imparting additive comprised of sodium carbonate present in an amount in the range of from about 1% to about 4% by weight of the cement in the composition. The cement composition is pumped into the zone to be cemented and allowed to set into a hard impermeable mass therein.

A method of the present invention for cementing a pipe string in a well bore without substantial loss of cement into fractures, vugs and other highly permeable subterranean zones is comprised of the following steps. A delayed thixotropic cement composition is prepared comprising Portland cement, sufficient water to form a slurry and a water soluble delayed thixotropy imparting additive selected from the group consisting of carbonic acid and alkali metal carbonates. The cement composition is pumped into the annulus between the pipe string and the walls of the well bore and then allowed to set into a hard impermeable sealing mass therein. As mentioned, the water soluble delayed thixotropy imparting additive can first be dissolved in the water, and just prior to pumping the cement composition into the annulus, the water is added to the cement and any additives utilized.

In order to further illustrate the delayed thixotropic cement compositions and methods, the following examples are given.

EXAMPLE 1

Various thixotropic cement compositions of this invention were prepared comprised of API Class G Portland cement, fresh water, a delayed thixotropy imparting additive comprised of sodium carbonate, a hydroxyethylcellulose viscosifier, and a sodium chloride accelerating agent or a carboxymethylcellulose set retarder. The cement compositions were mixed in a Waring blender and conditioned in an atmospheric consistometer to the test temperature. After conditioning for 20 minutes, the rheology of the cement compositions was determined in accordance with the procedure set forth in the above mentioned API Specification 10. Thereafter, the gel strength of the cement compositions was determined after 10 seconds and after 10 minutes. A thixotropy imparting agent of this invention typically has a 10 second gel strength only slightly higher than the 3 rpm reading in the thickening time test. The 10 minute gel strength is typically higher than 100 lbs/100 ft$^2$. The results of the tests as well as the components of the test cement compositions and their quantities are given in the Table below. In addition, the test cement compositions were tested for free water and the compressive strengths of the test cement compositions were determined. These test results are also given in the Table below.

TABLE

Thixotropic Cement Compositions And Test Results

| Cement Composition Components | Test Samples | | | | |
|---|---|---|---|---|---|
| | 1 | 2 | 3 | 4 | 5 |
| Water, parts by wt. | 72.6 | 72.6 | 70.5 | 70.52 | 71.2 |
| Thixotropy Imparting Additive[1], parts by wt. | 4 | 3 | 4 | 3 | 4 |
| Hydroxyethylcellulose[2], parts by wt. | 0.2 | 0.2 | 0.2 | 0.2 | 0.2 |
| Sodium Chloride[3], parts by wt. | 1.5 | 1.5 | — | — | — |
| Carboxymethylcellulose, parts by wt. | — | — | — | — | 0.75 |
| Cement[5], parts by wt. | 100 | 100 | 100 | 100 | 100 |
| Density, lb/gal | 13.9 | 13.9 | 13.9 | 13.9 | 13.9 |
| Thickening Time | | | | | |
| Temperature, °F. | 100 | 100 | 122 | 122 | 158 |
| 30 Bc, hr:min | 3:59 | 4:36 | 4:03 | 3:45 | 4:08 |
| 70 Bc, hr:min | 4:18 | 5:52 | 4:34 | 5:33 | 5:00 |
| 100 Bc, hr:min | — | 7:52 | 4:45 | 6:03 | 5:13 |
| Rheology, room temp. | | | | | |
| 300–200–100 | 70–51–30 | 108–81–53 | 85–63–40 | 100–76–52 | 165–130–82 |
| 60–30–6–3 | 22–16–9–8 | 40–29–18–18 | 31–23–14–13 | 37–26–19–18 | 59–40–22–20 |
| Rheology | | | | | |
| Temperature, °F. | 100 | 100 | 122 | 122 | 158 |
| 300–200–100 | 75–56–34 | 55–41–23 | 78–57–35 | 75–52–30 | 166–120–72 |
| 60–30–6–3 | 25–17–10–9 | 15–19–4–3 | 26–19–12–11 | 20–14–7–5 | 52–34–20–18 |
| Gel Strength | | | | | |
| Temperature, °F. | 100 | 100 | 122 | 122 | 158 |
| 10 sec/10 min | 11/300+ | 4/120 | 12/300+ | 8/250 | 24/70 |
| Compressive Strength[6] | | | | | |
| Temperature, °F. | 100 | 100 | 122 | 122 | 158 |
| at 50 psi, hrs:min | 6:16 | 0:20 | 3:55 | 6:41 | 4:53 |
| at 500 psi, hrs:min | 38:52 | 19:01 | 23:33 | 17.28 | 9:42 |
| in 24 hrs, psi | — | 520 | — | — | — |
| in 48 hrs, psi | — | 873 | — | — | — |

[1]Sodium carbonate acid.
[2]Viscosifier
[3]Set and strength accelerator
[4]Set retarder
[5]Dyckerhoff "G"
[6]Using Ultrasonic Cement Analyzer From the Table, it can be seen that at varying concentrations of sodium carbonate, the initial gel strength of the compositions at the conditioning temperature is slightly higher than the 3 rpm rheology reading, while in most cases, the 10 minute gel strength is higher than 100 and often more than 300. The rheology after conditioning at room temperature was moderate to low. Furthermore, the test results show that the thickening time can be accelerated or retarded by about 5 hours and the compositions set to 50 psi in less than 8 hours.

EXAMPLE 2

A delayed thixotropic cement composition of this invention was prepared by combining API Class G Portland cement with fresh water to form a cement slurry having a density of 13.9 pounds per gallon. A sodium carbonate thixotropy imparting additive was dissolved in the water prior to mixing it with the cement. The cement composition contained the components and amounts set forth in the preceding Table for Test Sample 1. After mixing, the cement composition was stirred and heated to 50° C. After conditioning the cement composition for 20 minutes at 50° C., the applied shear stress was reduced from 75 Pa to 10 Pa and increased again to 75 Pa. The shear rate-shear stress curve shown in FIG. 1 was recorded using a constant strain rheometer during the shear stress reduction and increase.

As can be seen from FIG. 1, the shear rate when the shear stress was reduced was much higher than the shear rate when the shear stress was increased which indicates that the cement composition was building additional gel strength after being subjected to a lower stress which is typical thixotropic behavior.

EXAMPLE 3

Figure 2:
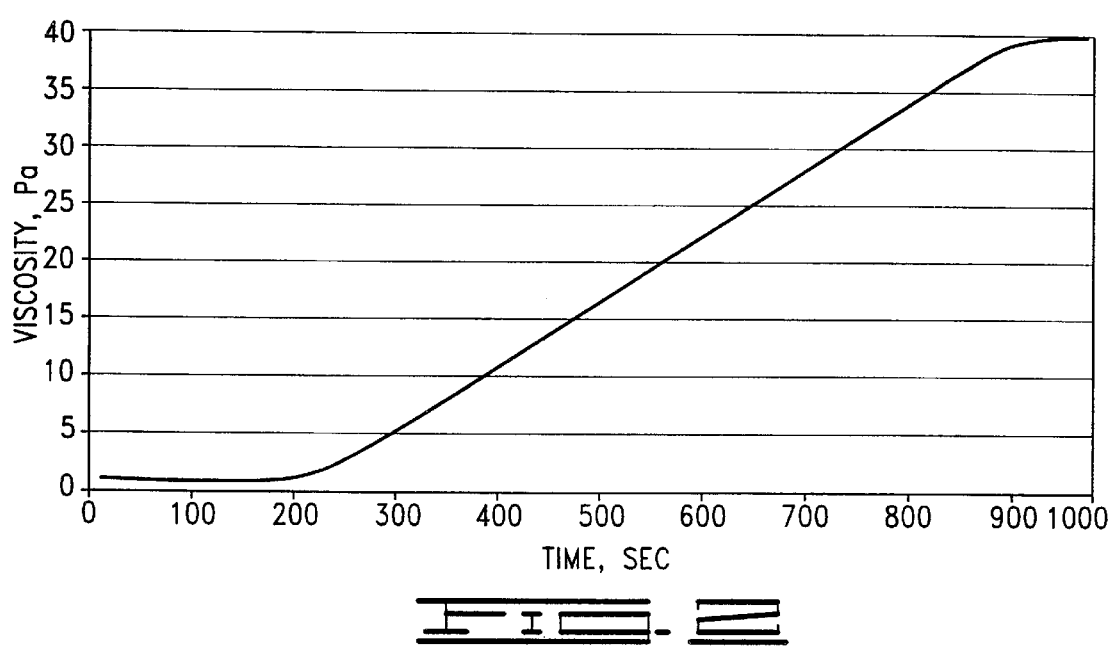
FIG. 2 shows the gel strength development of a thixotropic cement formulation at 50° C. at a constant frequency of 0.5 Hz and a constant stress of 2 Pa.

In another test using a portion of the thixotropic cement composition described in Example 2, the gel strength development of the composition was determined at a constant stress over time. A thixotropic cement composition identical to that described in Example 2 was prepared, placed in a rheometer and heated to 50° C. After conditioning the composition for 20 minutes at 50° C., the stirring was stopped and an oscillation experiment was started to determine the gel strength development of the composition. A constant frequency of 0.5 Hz and a constant strain of 2 Pa was applied and the development of viscosity over time was measured. A graph of the viscosity v. time was prepared which is shown in FIG. 2. From FIG. 2, it can be seen that the viscosity of the thixotropic cement composition was constant for about the first 250 seconds, but thereafter the viscosity increased over time to a final gel strength of 126 Pa.

Thus, the present invention is well adapted to carry out the objects and attain the ends and advantages mentioned as well as those which are inherent therein. While numerous changes may be made by those skilled in the art, such changes are encompassed within the spirit of this invention as defined by the appended claims.

What is claimed is:

1. A method of cementing in a subterranean zone penetrated by a well bore comprising the steps of:

(a) preparing a delayed thixotropic cement composition comprising a hydraulic cement, sufficient water to form a slurry and a water soluble delayed thixotropy imparting additive selected from the group consisting of carbonic acid and alkali metal carbonates;

(b) pumping said cement composition into said zone; and (c) allowing said cement composition to set into a hard impermeable mass therein.

2. The method of claim 1 wherein said thixotropy imparting additive in said cement composition is sodium carbonate.

3. The method of claim 1 wherein said thixotropy imparting additive in said cement composition is present in an amount in the range of from about 0.1% to about 8% by weight of hydraulic cement therein.

4. The method of claim 1 wherein said hydraulic cement in said cement composition is Portland cement.

5. The method of claim 1 wherein said hydraulic cement in said cement composition is API Class G Portland cement.

6. The method of claim 1 wherein said water in said cement composition is selected from the group consisting of fresh water, unsaturated salt solutions and saturated salt solutions.

7. The method of claim 1 wherein said water in said cement composition is present in an amount in the range of from about 35% to about 100% by weight of hydraulic cement therein.

8. A method of cementing a pipe string in a well bore without substantial loss of cement into fractures, vugs and other highly permeable subterranean zones comprising the steps of:

(a) preparing a delayed thixotropic cement composition comprising Portland cement, sufficient water to form a slurry and a water soluble delayed thixotropy imparting additive comprised of sodium carbonate present in an amount in the range of from about 0.5% to about 4% by weight of cement in said composition;

(b) pumping said cement composition into the annulus between said pipe string and the walls of said well bore; and (c) allowing said cement composition to set into a hard impermeable mass therein.

9. The method of claim 8 wherein said water is selected from the group consisting of fresh water, unsaturated salt solutions and saturated salt solutions, and is present in said cement composition in an amount in the range of from about 40% to about 90% by weight of cement therein.

10. The method of claim 8 wherein said water soluble delayed thixotropy imparting additive is first dissolved in said water and just prior to pumping said cement composition in accordance with step (b), said cement is mixed with said water.

11. The method of claim 8 wherein said cement is API Class G Portland cement.

* * * * *